United States Patent [19]

Bolsey

[11] 3,932,703

[45] Jan. 13, 1976

[54] IMAGE MOTION AND CHANGE TRANSDUCERS AND SYSTEMS CONTROLLED THEREBY

[76] Inventor: Emil J. Bolsey, White Plains, N.Y. 10606

[22] Filed: July 8, 1974

[21] Appl. No.: 486,065

Related U.S. Application Data

[63] Continuation-in-part of Ser. No. 193,950, Oct. 29, 1971, Pat. No. 3,823,261, which is a continuation-in-part of Ser. No. 778,870, May 27, 1968, Pat. No. 3,617,016, which is a continuation-in-part of Ser. No. 118,194, June 9, 1961, abandoned.

[52] U.S. Cl............................ 178/6.8; 178/DIG. 33
[51] Int. Cl.² .......................................... H04N 7/18
[58] Field of Search....... 178/6.8, DIG. 38, DIG. 33; 340/227 R, 227 D; 250/214 L, 209

[56] References Cited

UNITED STATES PATENTS

| | | |
|---|---|---|
| 3,465,169 | 9/1969 | Foerster .......................... 250/214 L |
| 3,686,434 | 8/1972 | Lemelson..................... 178/DIG. 38 |
| 3,743,768 | 7/1973 | Copland....................... 178/DIG. 38 |
| 3,781,842 | 12/1973 | Campman........................... 250/209 |

*Primary Examiner*—Howard W. Britton
*Attorney, Agent, or Firm*—Amster & Rothstein

[57] ABSTRACT

A selected area of an arbitrary image is scanned to derive analog video signals which are filtered and converted to binary signals which are compared with a signal representative of a reference image to produce a signal indicative of differences occurring between the scanned and reference images.

2 Claims, 10 Drawing Figures

IMAGE MOTION AND CHANGE TRANSDUCERS AND SYSTEMS CONTROLLED THEREBY

This application is a continuation-in-part of my copending application Ser. No. 193,950, filed Oct. 29, 1971, now U.S. Pat. No. 3,823,261, which is itself a continuation-in-part of application Ser. No. 778,870, filed May 27, 1968 (now U.S. Pat. No. 3,617,016) which was itself a continuation-in-part of application Ser. No. 118,194, filed June 19, 1961 (now abandoned). The disclosure of my U.S. Pat. No. 3,617,016 is hereby incorporated herein by reference and made part thereof.

The present invention relates to automatic devices for comparing spatial and temporal energy patterns received from one or more energy radiating or reflecting bodies, or, more specifically, for comparing images.

Automatic image comparators have diverse applications, for example in the preparation of accurate maps from aerial stereophotographs, as is done in photogrammetry, or in the conversion of printed or typed characters or symbols into electrical signals suitable for computers, as is done in optical character recognition (OCR), or in the protection of premises against unlawful intrusion and fire, or to the alignment of tools and work pieces in manufacturing operations such as, for example, the production of integrated circuits and other semi-conductor devices, where photolithographic masks must be brought into precise registry with semi-conducting wafers.

In some of the applications of the invention, as in particular for the detection of intrusion of fire, it may be simply desired to determine identity, or "sameness," prevails between the images being compared, which are of a generally stationary subject and produced by a stationary optical system. Under normal conditions, all images are identical to an initially recorded reference image. The presence of differences caused by intrusion, fire or other event must be detected, but not motion as such. However, indication of the direction of such event may be desired, as well as automatic aiming toward it of other devices, such as cameras.

In other applications, such as in the alignment of photolithographic masks referred to above, detection of image displacements is desired, rather than the determination of changes of image content.

In further applications yet, such as in matching corresponding areas of aerial stereophotographs, it is important to be able to ascertain that the images being compared are indeed of the same subject as well as to accurately determine their photo-coordinates, or relative alignment.

My U.S. Pat. No. 3, 617,016 claims image motion and change transducers and systems controlled thereby which are adapted primarily to sense image displacements, as in automatic vehicle guidance and for image motion compensation in aerial or satellite photography. This continuation-in-part primarily relates to and further develops devices (disclosed in my patent referred to above) for automatically performing functions which, if performed by human operators, should necessitate the examination of a field of view, the recognition therein of one or more specific patterns of interest, the comparison of said patterns with a normal, or reference, pattern to determine comparatively whether any differences or misalignments are present.

More specifically, it is an object of the invention to provide apparatus for automatically detecting changes occurring within a field of view and for generating alarm signals in response thereto, such apparatus being capable of reliable, unattended operation over an extremely wide range of subject brightness and being relatively insensitive to noise-like components of the scanner output.

Another object of the invention is to provide an output signal so related to the location of a detected change as to permit another device to be aimed thereat, automatically or otherwise.

It is a further object of the invention to provide an essentially tamper-proof arrangement, in which one or more scanners, located in the premises to be protected, cooperate with memory and with signal-comparing means located remotely from the scanners.

It is yet another object of the invention to effect a very accurate relative alignment of tools and/or workpieces in manufacturing operations, by means of specially provided markers or using existing patterns, the accuracy of alignment being, in some cases, better than the resolving power of the optical system used.

It is also an object of the invention to provide apparatus for automatically recognizing one or more patterns among a plurality of patterns, to generate an output signal which is characteristic of the recognized pattern, or to generate another output signal whenever the pattern cannot be satisfactorily identified.

In accomplishing the above objects in accordance with the present invention, a selected area of an arbitrary image is scanned and the video pattern converted into analog video electrical signals. These signals are treated to emphasize their intermediate frequency range components and converted into binary signals which are compared with a signal representative of a reference image to produce a signal indicative of differences occurring between the scanned and reference image.

Further objects, features and advantages of the present invention will be appreciated by reference to the following detailed disclosure of presently preferred, but nonetheless representative, embodiments of the present invention when taken in conjunction with the appended drawings, wherein.

EMBODIMENT AS A CHANGE DETECTOR.

The primary purpose of this embodiment is to sense automatically changes occurring within its field of view, and to provide an alarm signal whenever such changes exceed a predetermined level of tolerance. The device can further generate directional signals suitable for indication of the direction in which a change is occurring, and for automatically aiming some other device such as a camera toward the change.

Figure 1:
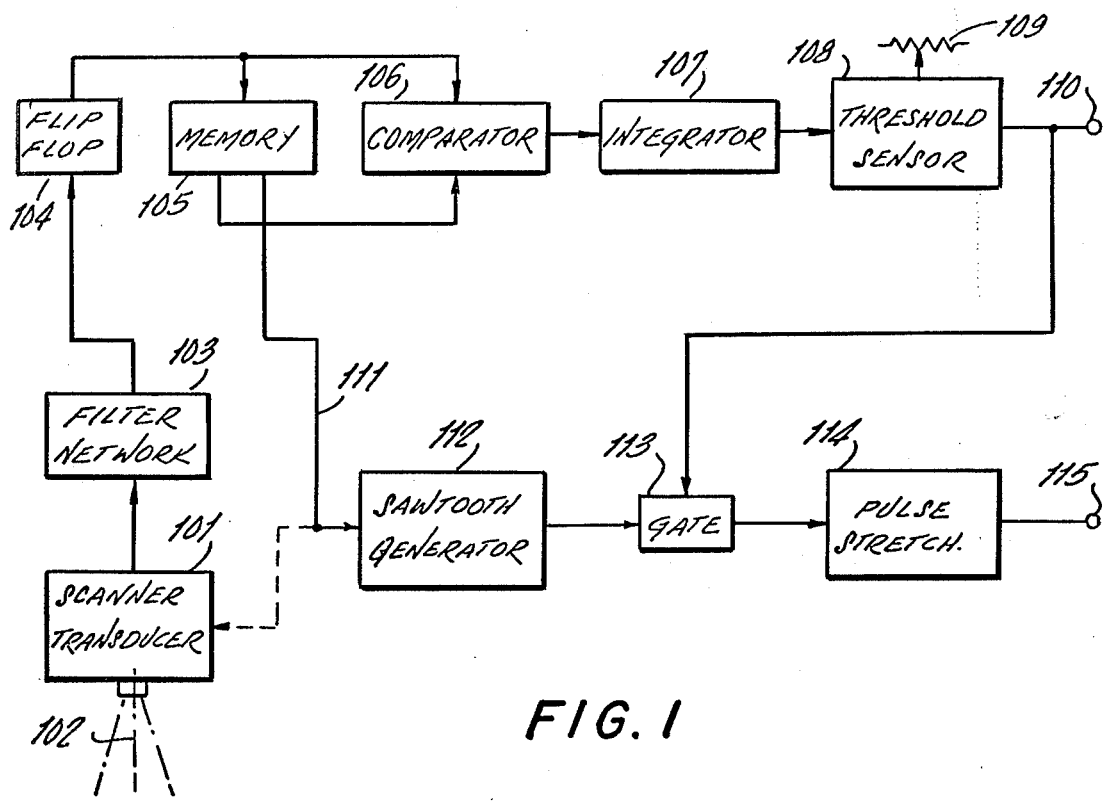
FIG. 1 is a simplified functional block diagram of one change detector according to the present invention.

The change detector comprises the main functional elements shown schematically in FIG. 1, in which the scanner and transducer assembly 101 may, but need not, be as shown in FIG. 24 of my U.S. Pat. No. 3,617,016, and the optical axis 102 may be in any desired position. Since the function of the scanner and transducer 101 is to convert brightness values of the subject or of the area being scanned into electrical signals, any known type of scanner and transducer capable of this task can in principle be used with the present invention. As there is no need to reproduce images from the electrical signals, scanning apertures much larger than usual, particularly in the direction perpendicular to the momentary direction of scan, are permissible. As a result, the change detector can operate with relatively little illumination and/or be equipped with relatively low-sensitivity photo-transducers, which are generally also less costly than high-sensitivty ones. Suitable apertures are illustrated throughout my above-mentioned patent.

The width of the aperture is selected so that it subtends approximately the same field angle as the smallest object or person of which the change detector must recognize the addition, removal or displacement. Therefore, other things remaining the same, the greater the distance to such object or person, the narrower the aperture must be.

As to the length of the aperture in the direction perpendicular to the direction of scan, a value of roughly three or four times its width is generally satisfactory.

In some possible scanner arrangements, the photosensitive element may be located directly in the scanned image surface, and may then have the size and shape of the scanning aperture which it functionally replaces. Silicon junction and barrier-type photocells, and photoresistors made of cadmium sulfide, selenide, and sulfo-selenide, lend themselves well to this disposition. The latter types are attractive because they have a high output and are inexpensive; they are however slow-responding and therefore require a considerably more pronounced emphasis of the higher-frequency components of the video signals they produce than do the faster-responding types.

Peaking, that is frequency-limited emphasis of the video, is generally useful in maximizing the number of significant zero-crossings of the processed signal, as will be explained in detail later. Significant zero-crossings are those which are related to the brightness values within the field being scanned, rather than to electrical noise generated by the system itself. It has been found that, if excessive high-frequency emphasis is attempted, few, if any, significant zero-crossings are added, but that the time-position of all zero-crossings exhibits added variability due to noise. Some new zero-crossings entirely due to noise and thus not significant may be added. This condition is clearly not desirable.

Since large-amplitude, low-frequency components in the video signal would tend to mask the higher-frequency components, they must be attenuated sufficiently to allow such high-frequency components to result in zero-crossings, since it is important that zero-crossings be present with sufficient density throughout the scan period for the device to have adequate sensitivity to changes anywhere within its field of view, as its sensitivity depends on the density of zero-crossings. In practice, a rising frequency characteristic having a positive slope of six to twelve decibels/octave up to some peak frequency which depends on operating conditions has been found desirable. Networks capable of imparting such a characteristic to the video signal are well known in the art, and filter 103 is such a network.

The peaked video signal at the output of filter 103 is quantized by a flip-flop 104, which changes state whenever the peaked video signal crosses the zero level and changes its polarity. The more frequently this occurs, the better the capability of the device to sense changes.

The memory 105 may be in the form of a magnetic recording surface carried by, or integral with, the scanner; such an arrangement is shown, for example, in FIG. 24 of my U.S. Pat. No. 3,617,016; the memory may also be separated physically from the scanner, and be of any type suitable for acting as a source of reference signals. If separate, means for synchronization between scanner 101 and memory 105 must be provided, for example as described in the above patent in connection with FIGS. 1 and 2 thereof. In general, the scanner may synchronize the memory, or vice-versa, as may be more convenient, or both may be synchronized by a common a.c. power source, or by an independent source of synchronization signals.

Figure 2:
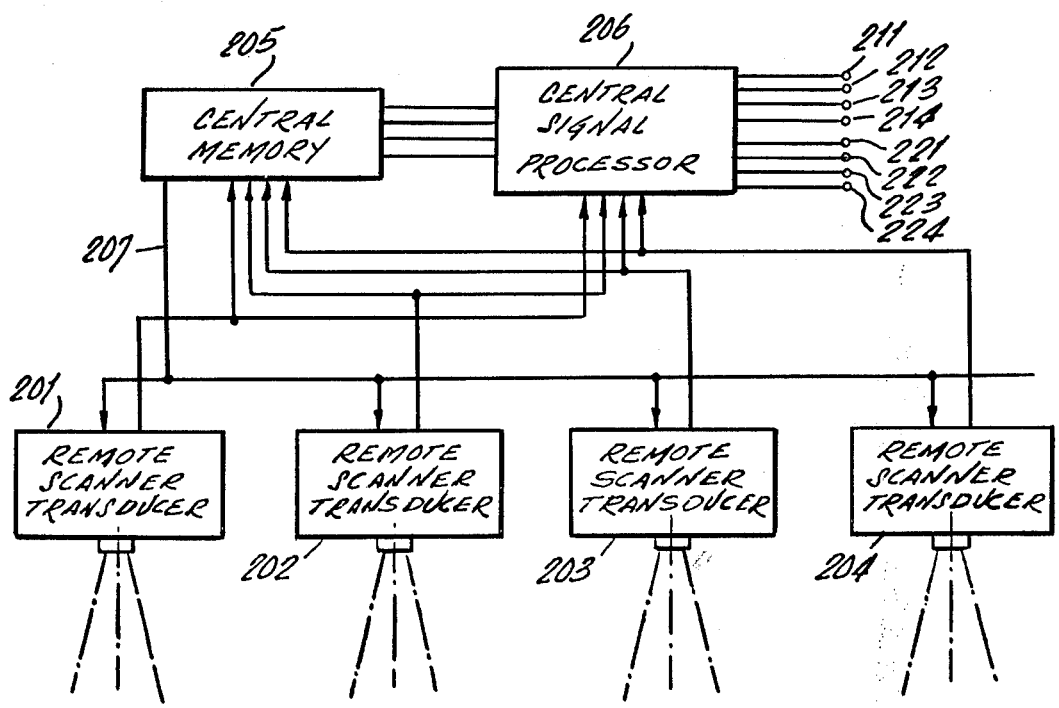
FIG. 2 is a simplified functional block diagram illustrating a multiple installation comprising devices of the type shown in FIG. 1.

In one possible arrangement of the change detector, a plurality of scanners are provided, which may be located throughout a building, or buildings, and which cooperate with one centrally located multiple memory in the form, for example, of a multi-track magnetic drum, or disc, of the kind commonly found in digital computer installations. FIG. 2 represents such a multiple-scanner installation comprising scanners (and transducers) 201, 202, 203, 204 and possibly more as desired, central memory 205, and a central signal-processing unit 206 to be described later. Synchronization may be obtained most simply by driving all scanners and the drum (or disc) memory by synchronous motors connected to a common a.c. supply. Alternately, a synchronization signal, pre-recorded on the drum, is played back during operation of the system and transmitted to the scanners over a common line 207. Synchronization is effected, for example, as explained in connection with FIGS. 4 and 5 of my above-mentioned patent.

Substantial economic advantages may be derived from the use of a central memory and processing unit in multiple installations, since the scanner-transducer units are far simpler than if equipped with individual memories and since other parts of the system, such as power supplies, can be centralized. A most useful characteristic of this disposition is however its resistance to tampering, such as efforts to disable it by interfering with the lines connecting the scanners to the central unit, or with the scanners themselves. Indeed, under normal conditions, a specific, precisely defined video signal corresponding to the particular reference signal recorded for each scanner must at all times reach the central unit. Any interference with the transmission of the proper signal would automatically result in an alarm signal at the output of the signal processing unit 206.

Returning to FIG. 1, the purpose of signal comparator 106 is to detect differences between the binary signal at the output of flip-flop 104 and a normally similar binary reference signal produced by memory 105. These differences may be due to any change within the field of view of the scanner 101 such as, for example, the entry of a person or the addition, or subtraction, of one or more objects, fire or smoke, or a water leak. As a rule, there is however no need to sense the direction or speed of displacement of objects, or of images, to track such objects, or to compensate for image displacement, as is explained in detail in my above-mentioned patent. For these reasons, comparator 106 does not require the delay means shown therein, and can consist, for example, of a logic multiplier, or of a simple "exclusive-OR" gate, for example, as will be described in detail later.

Both inputs to comparator 106 being binary, the comparison is one of logic state or polarity. Whenever the state of the flip-flop 104 is incorrect, indicating a change in the field of view of the scanner 101, a fixed-polarity signal is generated by comparator 106. This signal is exactly analogous to the signal described on lines 66 and 67, column 18 of my above-referenced patent, except that the complementary of one of the input signals specified therein is used here. The result is that no signal appears at the output of comparator 106, acting as a logic multiplier, under conditions of a perfect match, rather than a maximum signal.

Integrator 107 has a relatively short time-constant. It has no output under conditions of perfect match. Whenever a mismatch is present, it produces a ramp-like signal, the amplitude of which increases in relation to the duration of the mismatch, which is itself a measure of the severity of the change having occurred in the field of view of the scanner. Means (not shown) are provided to reset the integrator 107 to the no-output condition at the end of the mismatch period.

An output signal is produced at alarm terminal 110 if threshold sensor 108 determines that the amplitude of the ramp-like signal at its input exceeds a level pre-set on potentiometer 109. The presence of a threshold avoids the generation of alarm signals in case of insignificant changes occurring in the field of view, or of circuit noise. Other means for discrimination against circuit noise or insignificant events will be described later in detail.

In some applications of the change detectors, it is useful to also generate a signal which is indicative of the direction of a change resulting in an alarm output at terminal 110. A voltage proportional to the angle between some arbitrary reference direction and the direction of the event causing an alarm can, for indication purposes, actuate a properly calibrated voltmeter; alternately, this same voltage can control a swiveling camera mount, for example, in a manner known to those versed in the art, so as to make such camera point toward the event.

In order to generate such a voltage for a constant angular velocity scan, a saw-tooth signal, produced by generator 112, is initiated once per scan cycle, at the instant the scan is directed towards the reference direction. A trigger signal, produced within the memory 105 by means not shown, applied to generator 112 through line 111, controls the initiation of the saw-tooth in known manner.

When an alarm signal appears at terminal 110, gate 113 is momentarily opened, allowing a "slice" of the saw-tooth to reach pulse stretcher 114, which produces at terminal 115 an essentially constant output signal having the average amplitude of the slice, hence being proportional to the angular coordinate of the alarm-causing event.

In general, the slope of the signal produced by generator 112 should be proportional to the angular velocity of the scan. Thus, while a constant slope saw-tooth is described in the example given of a constant angular velocity scan, differently shaped signals may be used for different scan types.

For surveillance purposes, a unidimensional scan, such as a circular one, or a sector scan is usually adequate. Hence the directional information available is likewise unidimensional. Where two-dimensional directional information is desired, one can obviously use a two-dimensional scan pattern. Alternately, one can combine two unidimensional change detectors as just described to provide a two-dimensional system.

Referring again to FIG. 2, central processing unit 206 comprises, for each scanner-transducer such as 201, 202, etc., one set of the elements described above to provide individual alarm signals at terminals 211, 212, 213, etc. and directional signals (if desired) at terminals 221, 222, 223, etc., respectively corresponding to scanners 201, 202, 203, etc. To provide directional signals, only one saw-tooth (or other appropriate signal shape) generator need be included to feed in parallel all gates and pulse stretchers.

Figure 3:
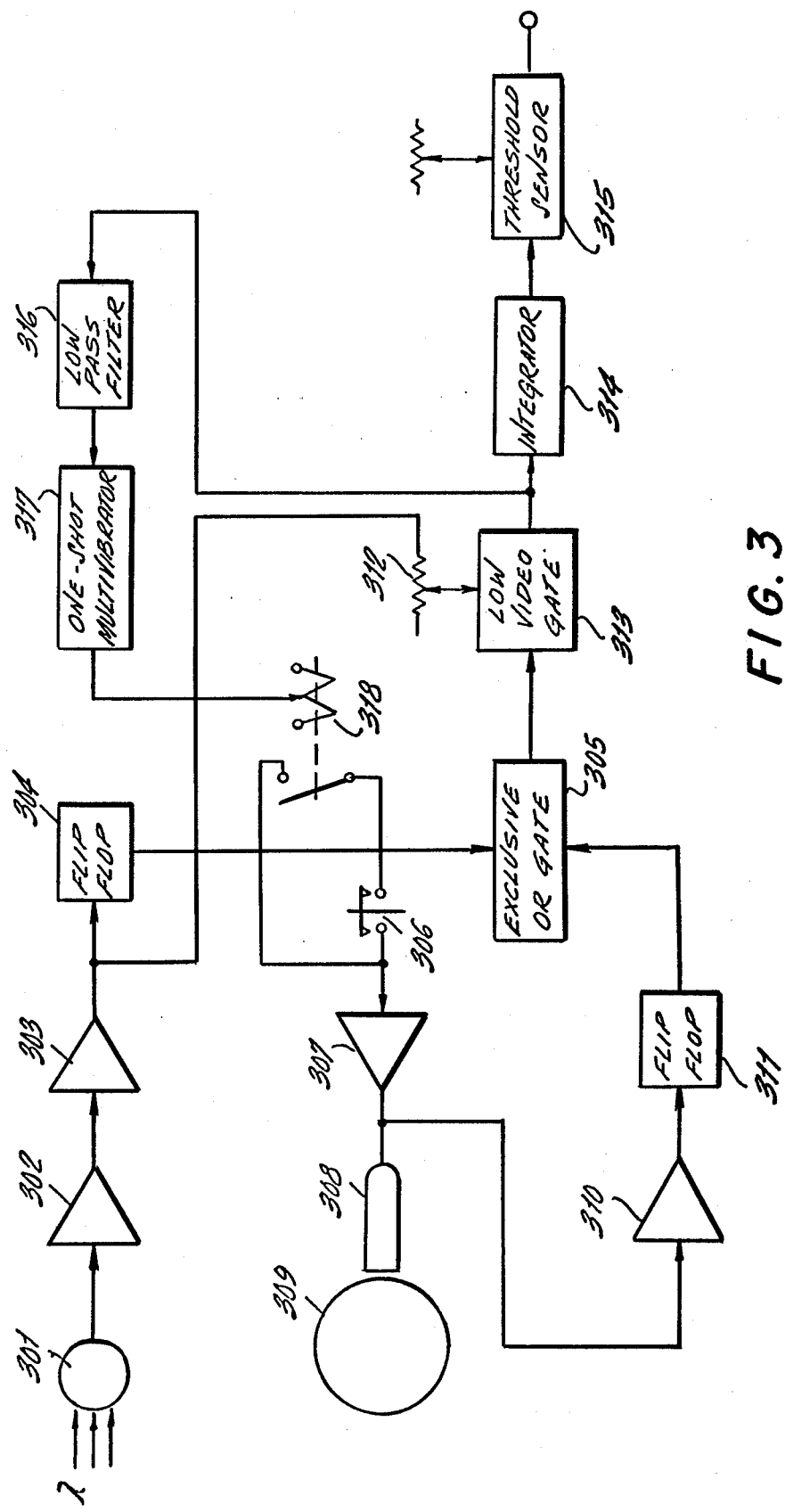
FIG. 3 is a detailed block diagram of a change detector according to the invention.

FIG. 3 represents in greater detail the elements of the change detector which are necessary for the production of alarm signals. During each scan, the modulated light flux received by photocell 301 produces an input signal for amplifiers 302 and 303, the latter incorporating the frequency discrimination function of network 103 (FIG. 1). As explained above, flip-flop 304 changes its state in accordance with the zero-crossings of the signal at the output of amplifier 303; the binary signal produced thereby is applied to the exclusive-OR gate 305 and, whenever switch 306 is closed or relay 318 actuated for the purpose of recording a reference on drum 309, to amplifier 307 and to magnetic head 308. Switch 306 is however normally open and the reference signal previously recorded on the magnetic surface of drum 309 is read by head 308 to drive amplifier 310 and flip-flop 311, which restitutes to the reference signal its original binary character for polarity comparison with the output of flip-flop 304 in gate 305, as explained above.

The state of flip-flop 304 being dictated by the polarity of the peaked video signal at its input, under conditions of very low video amplitude, corresponding to very low subject contrast, circuit noise may cause random changes in the state of flip-flop 304. If these changes are of sufficient duration, an undesirable alarm signal may result if no special precaution is taken thereagainst, as for example by the insertion of an alarm-disabling gate 313 between comparator gate 305 and short time-constant integrator 314. Gate 313 is conductive only if a control signal derived from the output of peaked amplifier 303 exceeds a level predetermined by the setting of potentiometer 312, avoiding the possibility of noise-induced alarms. Means (not shown) rapidly reset integrator 314 to its no-output condition at the end of each pulse produced by gate 305.

For certain purposes, other types of signals may be used to control gate 313. As the relative noisiness of video signals tends to increase in their portions corresponding to dark areas of the subject, opening of gate 313 could for example be made to depend on the presence of a video signal for sufficient amplitude at the output of cell 301, or of amplifier 302. Or, since changes in the state of flip-flop 304 that occur under conditions of relatively high slope dV/dt of the video signal at its input are more likely to be correct, such slope can be converted into a gate-control signal by differentiation. Clearly, various combinations of the above gate-control schemes may also be found advantageous in increasing the reliability of the signals reaching integrator 314, it being kept in mind that, in the change detector embodiment of my invention, knowledge of the precise instant at which flip-flop 304 changes state is not essential, so that unreliable signals may simply be discarded.

In image displacement sensing embodiments, such as described hereinbelow and in my U.S. Pat. No. 3,617,016, instead of a logic gate 313 of the yes-no type, an analog multiplier may be employed so as to merely give greater weight to the output signals of gate 305 that are produced under favorable noise conditions, and vice-versa.

To enhance the usefulness of the change detector for the protection of premises, means may be provided to make it insensitive to changes occurring in preselected portions of its field of view, for example in the form of one or more additional magnetic tracks on drum 309, such tracks cooperating in known manner with heads, amplifiers and circuitry for first allowing the recording, and later the playback of signals adapted to perform the desired control of gate 313 or the like in full synchronism with the scanning action, enabling the change detector in some directions and disabling it in others.

At least one such additional track of drum 309 could, alternately, be made to store an additional reference signal, whereby for each such additional track an additional flip-flop such as 311 and an additional exclusive-OR gate such as 305 would be provided, one input of which being still received from flip-flop 304. The additional reference signal could correspond, for example, to the appearance of premises being monitored under different conditions of illumination than prevailed at the recording of the first reference. With such a multiple-reference arrangement, the outputs of all exclusive-OR gates such as 305 would be applied to an AND gate (not shown), the output of which would feed gate 313. This arrangement would insure that no alarm would be given as long as the output of flip-flop 304 would match at least one of the references.

An electro-optical device such as the change detector described herein may be called upon to operate over an extended range of subject brightness corresponding, at one end, to indoor artificial lighting conditions and, at the other end, to outdoor, full sunlight conditions; in addition, objects within the field of view may exhibit either very high, or very low reflectance. It is desirable that the photocell and associated amplifiers 302 and 303 be able to accommodate the extremely wide range of possible brightness, preferably without manual or automatic light-control means, as they are commonly used in photography. If the video gain can be made to vary as the reciprocal of the average light flux, the amplitude of the video signal becomes independent of illumination and is determined solely by subject contrast. It can be seen that a logarithmic response of the photocell, or of its associated amplifier 302 provides such a result.

Figure 4:
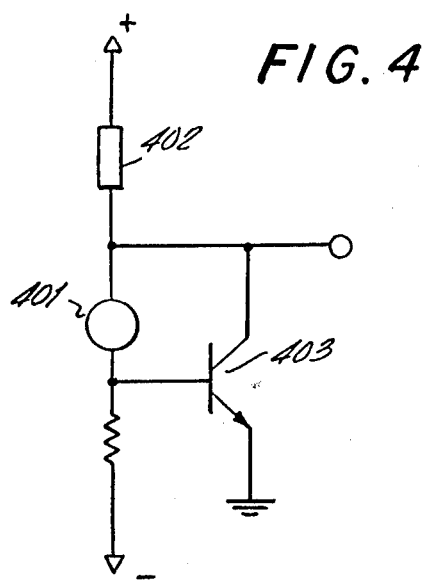
FIG. 4 is a schematic of a photocell and associated amplifier for the change detector of the invention.

FIG. 4 shows schematically an arrangement providing an approximation of the desired logarithmic characteristic, using a photoresistor 401, the conductance of which may be substantially proportional to illumination, and a non-linear collector resistance 402 of the type known as "Varistor," or "Thyrite." At low illumination levels, the collector current of transistor 403 is low, but the resistance of Varistor 402 is high; at high illumination levels, the opposite is true, with the result that signal amplitude at terminal 404 varies far less than it would if a fixed resistor were used as the collector load of transistor 403.

Another way to obtain a very nearly logarithmic characteristic above a certain illumination threshold is to use a silicon "solar" cell feeding a high input-impedance amplifier.

A progressive change in illumination which affects the entire field of view uniformly will not result in changes in the video signal, provided the transducer-amplifier characteristic is logarithmic, as explained above. Where this characteristic is only approximated, changes will occur in the video signal which may eventually result in unwanted alarms, unless the recorded reference by updated from time to time, generally as described in my above-referenced patent, in connection with FIGS. 4 and 5 thereof, for example.

Referring again to FIG. 3, the cut-off frequency of low-pass filter 316 is less than scan frequency. It therefore averages the output of gate 305. A change to be detected, such as the entry into the field of view of a new object, or person, is a localized event which results in one relatively long-duration pulse at the output of gate 305. This type of pulse will, as previously explained, result in a ramp-like signal at the output of integrator 314 and, if of long enough duration, in an alarm. It will not, however, produce a large signal at the output of low-pass filter 316.

Overall changes of illumination normally result in a multiplicity of relatively short pulses at the output of gate 305. Because integrator 314 is, as explained, reset at the end of each pulse, short pulses, no matter how numerous, will not result in large-amplitude ramps. These pulses have, however, an additive effect at the output of low-pass filter 316, which, when sufficient in amplitude, triggers one-shot multivibrator 317 and energizes relay 318 to cause the recorded reference to be upgraded to reflect the then prevailing subject appearance.

As will be apparent to those versed in the art, many other arrangements and combinations of the re-reference and alarm functions are possible without departing from the spirit of the invention. For example, instead of the signal generated by integrator 314, the threshold sensor 315 could receive the averaged output of multivibrator 317. In this arrangement, the alarm signal would be generated if the frequency of reference upgrading exceeded some predetermined value.

The horizontal field scanned by a change detector according to the present invention and used, for example, for intruder detection, should be dictated by the area to be protected and by the scanner location. This field may be as narrow as just a few degrees, or as wide as a full 360 degrees. By the use of oscillating or rotating mirrors, scanners can be made to cover the required field of view by simply changing the amplitude of the oscillation, or by changing the number of faces of rotating mirrors.

Figure 5:
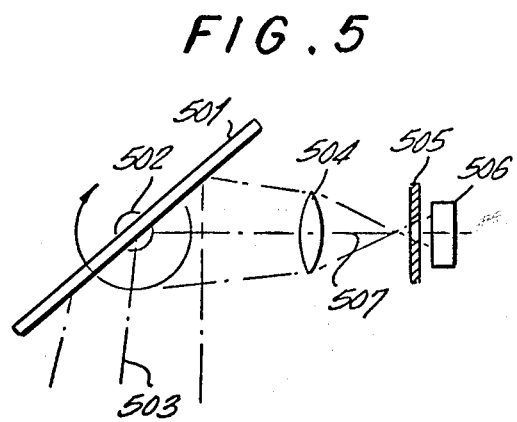
FIG. 5 is a simplified view of a scanning arrangement for the change detector.

FIG. 5 represents an arrangement which scans essentially 360° by means of a rotating double-faced mirror 501 pivoting about an axis 502 and being driven by means not shown. The reflected optical axis 503 rotates, as is well known, at twice the angular velocity of the mirror, sweeping over 360° twice per turn of the mirror. Objective lens 504, cooperating with mask 505 and photo-transducer 506, is stationary and supported by means not shown.

As the arrangement of FIG. 5 produces optical discontinuities when the plane of the mirror 501 is aligned with the optical axis 507 of lens 504, it would not be satisfactory in a visual imaging system; it is nevertheless adequate in a system exclusively concerned with the detection of changes.

Figure 6:
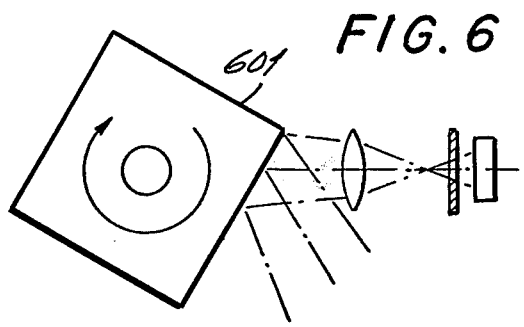
FIG. 6 is a simplified view of another scanner arrangement similar to that of FIG. 5.

FIG. 6 shows a variation of the arrangement of FIG. 5. In FIG. 6, a rotating four-sided mirror 601 is used, rather than a two-sided one, thus producing a 180° sweep four times per turn of the mirror. The other components of FIG. 6 are the same as those of FIG. 5. Different number of mirror faces can evidently be used, beside two or four, to provide other scan widths. For example, an eight-sided mirror will provide a 90° field and a six-sided one a 120° field.

Embodiment as an alignment device

Figure 7:
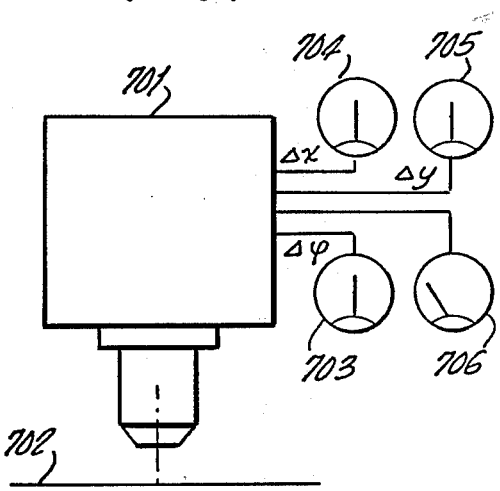
FIG. 7 illustrates an alignment device according to the invention.

FIG. 7 shows the arrangement of the image comparator as an alignment device which may, for example, be used as a "monocomparator" for the precise location of "pass-points" in photogrammetry. The image comparator 701 may, for example, include the components shown in FIGS. 11 and 13 of my U.S. Pat. No. 3,617,016, the object plane 702 being located relatively close to an appropriate objective system in order to provide optical magnification. Provision may also be made in known manner for simultaneous viewing of the scanned area by an operator, for example by beam-splitting.

The output of image comparator 701 may be displayed on meters 703, indicating image rotations, 704, indicating translation in the x-direction, 705 indicating translations in the y-direction, and 706 indicating any degree of dissimilarity of the image being scanned with respect to the recorded reference. Clearly, instead of merely displaying the respective misalignment signals, requiring an operator to manually effect realignment, these signals could, in known manner, actuate automatic positioning devices to perfect alignment of the image being scanned with respect to the recorded reference.

Further, if an excessive dissimilarity signal, as displayed on meter 706, should prevail, it may be an indication that the portion of the image being scanned is not the proper one. An operator would then search for the desired portion by moving the object relatively to the detector 701, or vice-versa, but this operation could evidently be carried out automatically by means known to those versed in the art. Once an area is found which results in an acceptably small dissimilarity signal, precise relative alignment is then allowed to proceed.

In a typical monocomparator, a larger memory capacity may be necessary than can conventionally be provided on a drum such as shown in FIG. 11 of my above-mentioned patent. It is then more practical to separate the memory function from the scanner, as shown in conjunction with one mode of operation of the systems illustrated by FIGS. 1, 2, 4 and 5 of the parent case, and in FIG. 2 hereof.

In other alignment applications of the image comparator, for example for the determination of terrain relief from the measure of parallax of aerial stereo-photographs, relative alignment between two images must be obtained, rather than between an image and a recorded reference. In these applications, a signal is obtained from a second, synchronously running scanner acting as a source of reference signal, as explained in my U.S. Pat. No. 3,617,016 in connection with the aiming mode of the device shown in FIGS. 1 and 2 thereof, lines 3 to 18, column 5. The arrangement described therein is for alignment in two directions only, rotations not being sufficient in a guidance application. Rotational alignment could clearly be added if required.

It will be obvious that useful systems can be made for similar purposes by combining two or more scanners and memory means without departing from the spirit of the invention. Such an arrangement for the precise alignment of a photographic mask and of a photosensitized substrate, as is used, for example in the manufacture of semi-conductor devices and particularly in integrated circuits, is depicted by FIG. 8.

Figure 8:
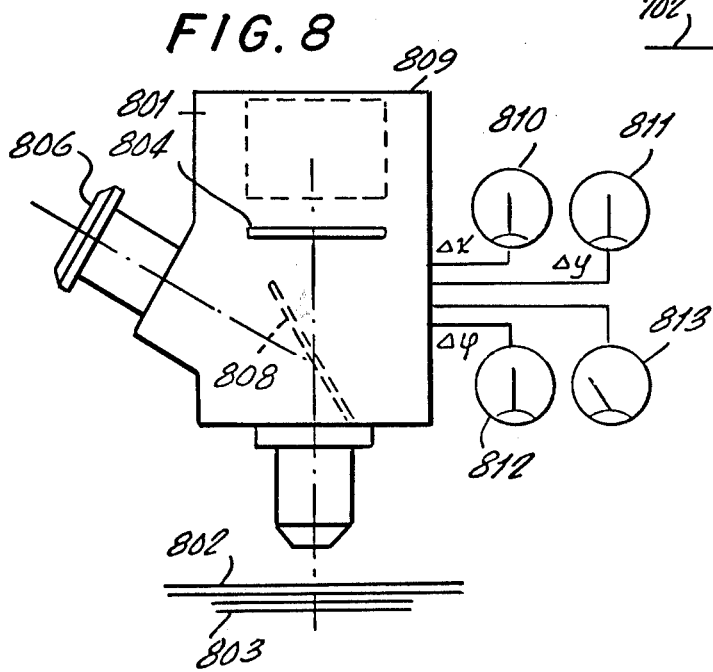
FIG. 8 illustrates another alignment device according to the invention.
Figure 9:
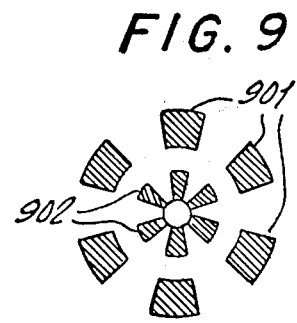
FIG. 9 shows alignment patterns to be used with the device of FIG. 8.

The optical system of the image comparator 801 of FIG. 8 is adapted to allow selective scanning of either one of two special alignment targets, or patterns, respectively carried by the mask 802 and by the substrate 803. Target 901 (FIG. 9), carried by mask 802, and target 902, carried by substrate 803, when aligned, may be concentric and may consist, for example, of alternate bright (or transparent) and dark (or opaque) sectors, although other types of patterns are also practical. Shutters (not shown) may be inserted through slit 804 into the optical path of image comparator 801 so as to selectively block out the light from either target 901, or 902. Illumination means (not shown) ensure a sufficient light flux to the detector and a high signal/noise ratio at the output of the detector where necessary for the desired accuracy.

In operation, the mask 802 may be brought into alignment with the optical axis 807 by observation through eye-piece 806, which receives a portion of the light reflected on partial mirror 808, and a reference recording made of the signal thus produced. During this operation, the proper shutter is used to permit only light received from the mask to enter the scanner 809. The first shutter is then removed, and the other one inserted, allowing only the light from the substrate pattern (902) to reach the scanner. The substrate is then aligned by nulling the displacement outputs of the change detector, as read on meters 810, 811 and 812. Meter 813, the "dissimilarity" indicator, will also be nulled if the operation has been performed correctly, but will register a large output if not.

Alternately, a signal corresponding to the precisely correct alignment of patterns 901 and 902 may be prerecorded into the system's memory and both mask 802 and substrate 803 aligned successively by reference to the prerecorded signal. As the alignment tolerances which are possible with a single scanner are a function of the rotational sensitivity of the detector, they increase with the distance from the alignment target. In an actual system for the alignment of relatively large masks and semi-conductor wafers, two identical scanners, operating on two sets of targets spaced as widely as practical are used; this results in essentially constant alignment accuracy over the entire wafer.

Pattern-Identification Embodiment

Figure 10:
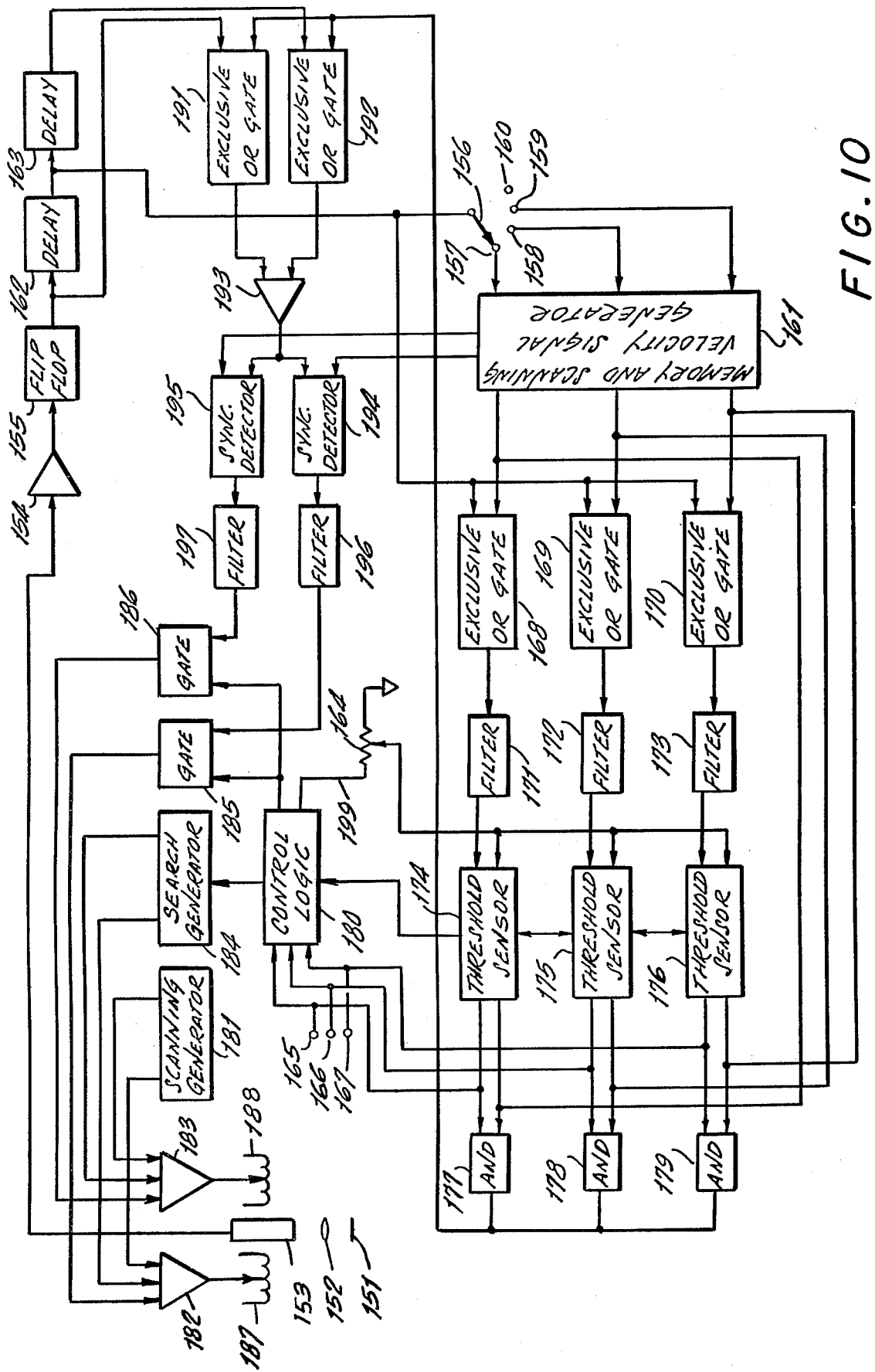
FIG. 10 is a functional block diagram of a pattern-identification device according to the invention.

FIG. 10 illustrates an arrangement for the automatic recognition and identification of individual patterns or symbols within a set by means of the image comparator of the invention. One of the best known applications of pattern recognition is the conversion of alphabetic characters or of numerals to electrical signals suitable for feeding into computers or for transmission to a remote receiving station.

Pattern 151 to be identified is located for scanning in the object plane of lens 152. Scanning is performed in known fashion by image dissector 153, which can be a deflectable photomultiplier tube, for example. Faster scanning than can conveniently be obtained by mechanical means and the creation of complex scan patterns adapted to the type of patterns to be recognized are desirable, and scanning is therefore best performed by electronic means in this adaptation of the image comparator. Electronic scanning further facilitates automatic realignment, as will be explained later.

The output of image dissector 153, amplified in peaked amplifier 154 and converted to a binary signal by flip-flop 155 as previously explained, is applied to memory channel selector 156 after passage through delay element 162, the purpose of which will be explained later.

Initially, selector 156 is successively placed in the active positions 157, 158, 159 to record in memory 161, one at a time, the signals corresponding to several patterns such as pattern 151 and located in the scanning position. Only three active positions of selector 156, hence three reference-recording channels are illustrated for the sake of clarity. In an actual working system, several dozen of active selector positions and memory channels may be provided, according to the number of patterns or symbols to be memorized and later identified.

After memory 161 has been loaded with the desired number of references, switch 156 is placed in the inactive position 160 and binary reference signals, reconstituted from the recorded signals as explained previously, are applied to exclusive-OR gates 168, 169, 170 for matching against the output of delay means 162. This output, of course, is representative of the pattern or symbol being scanned at that instant. The polarity of the signals applied to the exclusive-OR gates is so selected that, in case of a perfect match, the output of the corresponding gate is a logic "high." In case of a less-than-perfect match, the output would be predominatly "high," but would intermittently be "low." Low-pass filters 171, 172, 173 furnish variable amplitude outputs equal to the average of each of the outputs of the corresponding gates, and which are therefore a measure of the degree of sameness of each reference with respect to the incoming signal. These analog outputs are applied to threshold sensors 174, 175, 176. Only one output normally exceeds the threshold level set by potentiometer 164, which may be fixed or variable, resulting in a single, non-ambiguous, output at one of the terminals 165, 166, 167, thereby identifying the pattern 151.

It will be recognized that the pattern-identification embodiment described so far is actually a multi-channel change detector, each channel being quite similar to the embodiment of FIG. 3. The functions of change detection and of pattern identification, or congruence detection, are complementary to each other. Therefore, a device adapted to perform one such function can also perform the other. It is however convenient to so select the polarity of the signals applied to the exclusive-OR gates that a logic "high" will result in each case from the condition of interest, namely a match for the pattern identifier, or a change for the change detector.

The arrangement of FIG. 10 described so far would be adequate to identify a plurality of previously memorized patterns provided each pattern be successively located precisely in the same position as at memorization time. Any misalignment would reduce the perfection of signal matching with the proper reference and thus result in a no-output condition if the threshold set on potentiometer 164 is not reached, or exceeded. It is therefore necessary, in practice, to provide for precise alignment of pattern 151 with respect to the scan pattern of tube 153, as explained below.

While references are being loaded into memory 161, scanning is performed by scan generator 181 driving $x$-deflection amplifier 182 and 4-deflection amplifier 183. Scan generator 181 is synchronized with memory and scan velocity signal generator 161 by means not shown. Search generator 184 is inactive and gates 185, 186 are closed during reference loading. During subsequent pattern scanning for identification, a no-output condition is sensed by control logic unit 180 through its NOR-function, activating the search generator 184 which superimposes relatively slowly varying signals upon the normal scan signals produced by generator 181. This causes the entire scan pattern to move according to some arbitrary pattern, such as an expanding spiral, until a significant output appears at one of the gates 168, 169, 170, at which time search generator 184 is disabled and gates 185, 186 are opened by the OR-function of control logic unit 180.

Simultaneously, one of the AND gates 177, 178, 179 is opened, allowing the corresponding reference signal to be applied to exclusive-OR gates 191 and 192, in which it is respectively matched against the undelayed binary video appearing at the output of flip-flop 155, and a doubly-delayed binary video furnished by delay unit 163. It will be recognized that the exclusive-OR gates 191, 192 are the functional equivalents of multipliers 171, 172 of FIG. 17 of my above-referenced patent, and that the signals appearing at the inputs of each gate are in exactly the same time-relationship as the signals appearing at the inputs of each multiplier. Moreover, the signal at the output of differential amplifier 193 (FIG. 10 hereof) is comparable to the output of differential amplifier 193 of the reference, and fluctuations of its average value similarly reflect the time differences between corresponding transitions of the reference and of the singly delayed binary signals. Further processing of the signal at the output of amplifier 193 can therefore be exactly as explained in the reference to generate signals indicative of misalignment at the output of filter 196 (for the $x$-direction) and of filter 197 (for the $y$-direction). Rotational misalignment signals obtained by low-pass filtering of the output of amplifier 193 could also be obtained and used to cause a corrective rotation of the entire scan pattern in known fashion, if desired. In general, it is however sufficient to provide alignment in the $x$- and $y$-directions by applying the outputs of filters 196, 197 to amplifiers 182, 183 through gates 185, 186, thus causing corrective fields to be generated by deflection coils 187, 188.

Threshold sensors 174, 175, 176 are electrically interlocked by known means (not shown) so that only one of them can, at any one time, provide a signal to the corresponding AND gate. If, as a result of a close resemblance between symbols to be recognized (such as O and Q, for example), more than one exclusive-OR gate 168, 169, 170 produces an output signal in excess of the preset threshold set by potentiometer 164, the above interlock results in none of the AND gates 177, 178, 179 being activated, hence in the search mode described above. The multiple-match condition is simultaneously signalled over line 198 to control logic unit 180, which, in response thereto, increases the drive to potentiometer 164, hence the threshold level, until only one exclusive-OR gate 168, 169, 170 furnishes a signal sufficient to operate the corresponding AND gate. When this (normal) condition prevails, gates 185, 186 are activated and alignment proceeds as explained above.

The above described embodiments are merely examples of the application of the principles of the present invention. Further embodiments will be apparent to those skilled in the art without departing from the spirit of scope of the present invention as defined by the following claims.

I claim:

1. Apparatus for comparing arbitrary images comprising, in combination: scanning means for scanning a selected area of a first arbitrary image, said means operating cyclically to provide at least one scan having a given video pattern, photosensitive means cooperating with said scanning means for changing each said video pattern into video electrical signals which are respectively the analogs of said video patterns, frequency-selective filtering and amplifying means for emphasizing the components of said video electrical signals which fall within an intermediate frequency range, quantizing means cooperating with said filtering and amplifying means for converting the electrical signals produced thereby into first binary signals, a source of reference binary signals comparable with said first binary signals and representative of at least one reference image to be compared with said first image, means for comparing said first binary signals with said reference binary signals and for producing at least one electrical output signal which is indicative of differences occurring between said binary signals, and means for attenuating said electrical output signal whenever the magnitude of said video signal or of a control signal derived therefrom is below a predetermined threshold.

2. Apparatus for comparing arbitrary images comprising, in combination: scanning means for scanning a selected area of a first arbitrary image, said means operating cyclically to provide at least one scan having a given video pattern, photosensitive means cooperating with said scanning means for changing each said video pattern into video electrical signals which are respectively the analogs of said video patterns, means for making the amplitude of said video electrical signals substantially proportional to the logarithm of the brightness of the area scanned at any particular instant, frequency-selective filtering and amplifying means for emphasizing the components of said video electrical signals which fall within an intermediate frequency range, quantizing means cooperating with said filtering and amplifying means for converting the electrical signals produced thereby into first binary signals, a source of reference binary signals comparable with said first binary signals and representative of at least one reference image to be compared with said first image, and means for comparing said first binary signals with said reference binary signals and for producing at least one electrical output signal which is indicative of differences occurring between said binary signals.

* * * * *